Jan. 7, 1930.  A. H. BRANDON  1,742,685
WEIGHT SUPPORT FOR VIBRATORY CONTROLS
Filed April 5, 1927  3 Sheets-Sheet 1
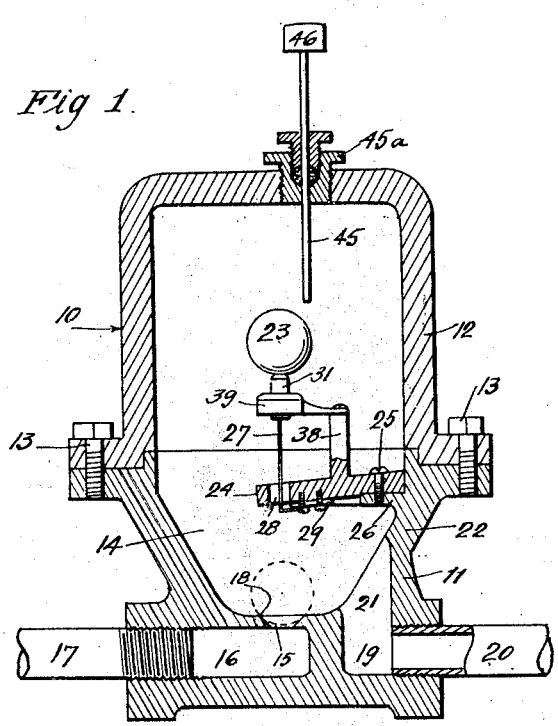
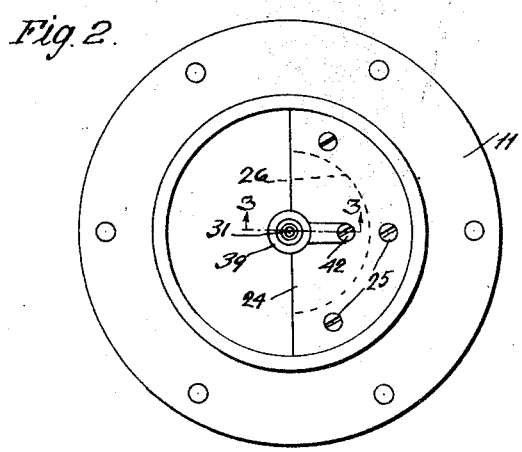
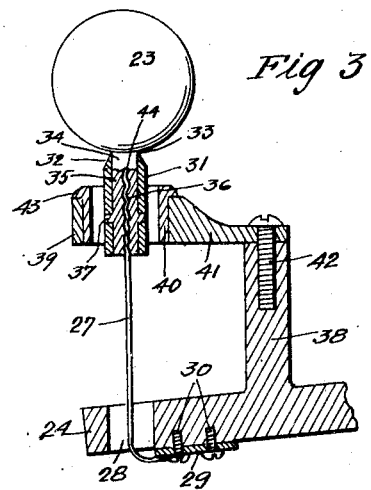
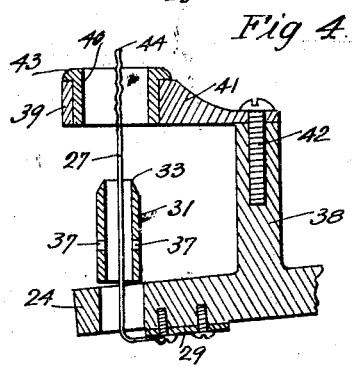
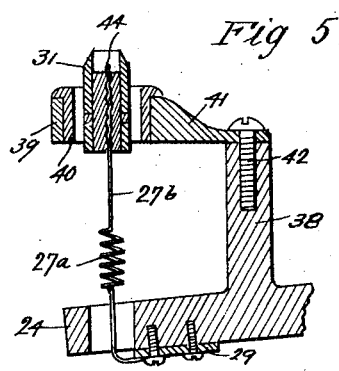
Inventor.
Arthur H. Brandon.
Attorney.

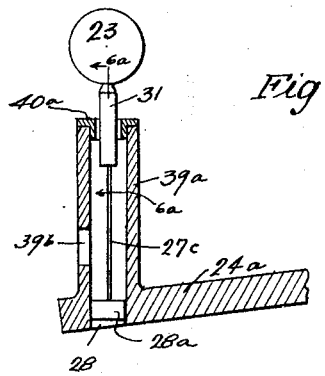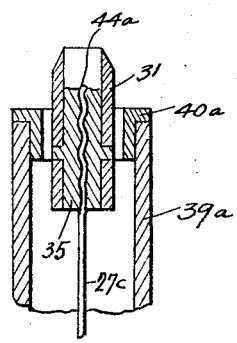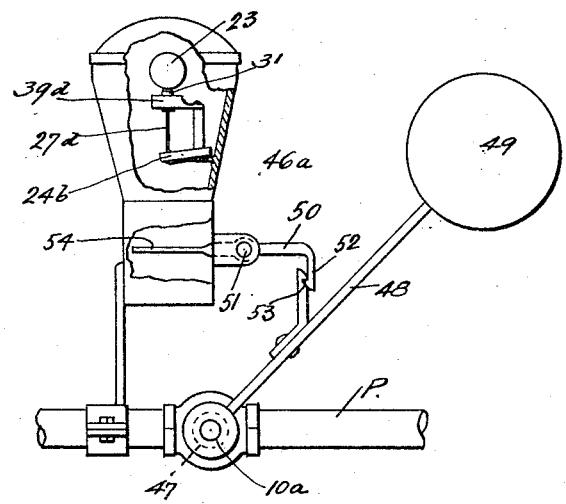

Jan. 7, 1930. A. H. BRANDON 1,742,685
WEIGHT SUPPORT FOR VIBRATORY CONTROLS
Filed April 5, 1927   3 Sheets-Sheet 3
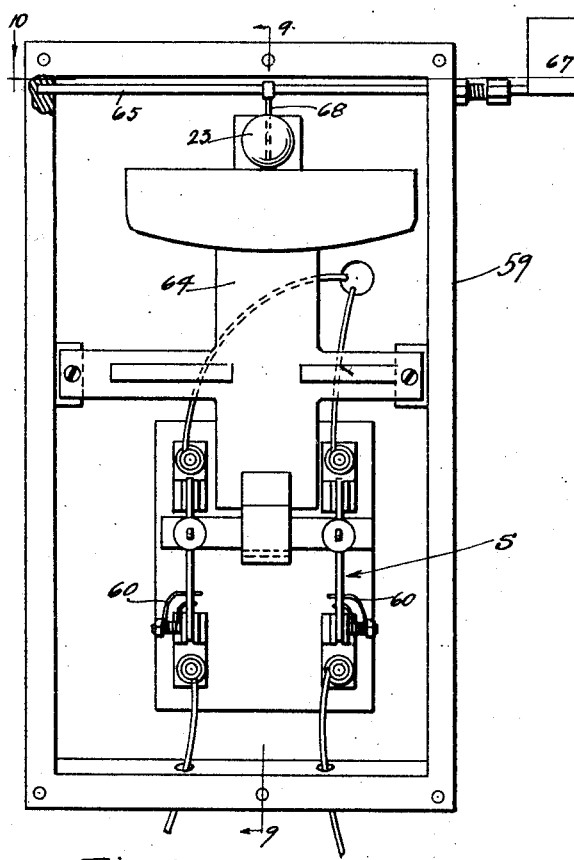
Fig. 8.
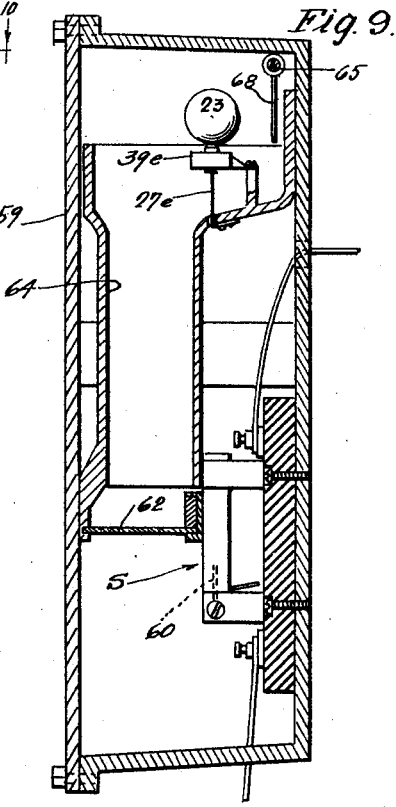
Fig. 9.
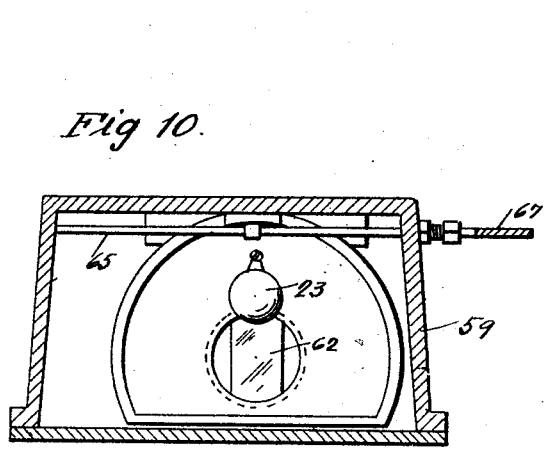
Fig 10.
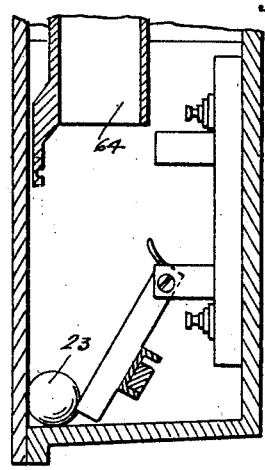
Fig. 11.
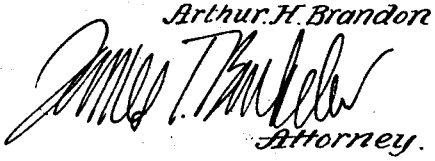
Inventor.
Arthur H. Brandon
Attorney.

Patented Jan. 7, 1930

1,742,685

UNITED STATES PATENT OFFICE

ARTHUR H. BRANDON, OF LOS ANGELES, CALIFORNIA

WEIGHT SUPPORT FOR VIBRATORY CONTROLS

Application filed April 5, 1927. Serial No. 181,246.

This invention relates generally to vibratory control devices wherein a weight is supported for dislodgment upon the occurrence of disturbances, such, for instance, as those incident to earthquakes or explosions. It is more particularly concerned with the supporting means for such a dislodgeable or displaceable weight, whereby a control device equipped therewith is given peculiar sensitivity so it responds operatively only when the disturbances are of a predetermined character.

Before discussing in detail the particular nature of the weight support, I will set out briefly several typical situations wherein a device of this character may be used to advantage. It will be understood, however, that the examples here given are in no way limitative, for the invention, considered in its broader aspects, is capable of adaptation to any controlling device or the like operable by virtue of displacement of a member due to vibration.

In the event of earthquakes or other vibratory disturbances of a severe character, fires and flooding of buildings often result from the breaking of gas and water service pipes or from broken electrical circuits. To prevent this it is desirable that means be provided to cut off the flow of gas, water or electricity where such services enter buildings and immediately upon the occurrence of the disturbances. Such means may be provided in the form of a displaceable weight, which weight is dislodged from its normal seat by the disturbance, and in its displacement check the passage of gas, water or electricity to the building. The weight, in its displacement, may comprise one of the elements which forms, in itself, a closure member for interrupting the passage of gas or water, or an element for closing an electric circuit, which, in turn, operates mechanism cutting off the supply of gas, water or electricity to the building; or it may act indirectly to release holding means and thereby allow other mechanism to act automatically to cut off the service supply.

However, it will be readily understood that it is most desirable that the weight be not dislodged unless the disturbances are of a character which would cause damage to the service lines. In other words, there are various "metropolitan vibrations" arising from the passage of heavy traffic, for instance, and earth tremors and quakes of certain natures, which do not tend to cause destruction, and were the weights to be dislodged under the influence of such vibrations, great inconvenience, costly delays and extensive resetting of weights could be entailed. Furthermore, where the controlling device is in the character of a valve interposed in a service line, it is highly desirable that the weight be not dislodged from its seat when the line or valve proper be struck by workmen or otherwise vibrated in the normal course of affairs.

Therefore, it is the principal object of the present invention to provide a support for the weight whereby said weight is enabled to hold its seat during disturbances of a predetermined character, and then insure dislodgment or displacement of the weight when the vibratory disturbances reach a predetermined amplitude or critical stage.

Generally, I accomplish this by the use of a resilient weight support having a limited capacity for resilient movement. Preferably, I provide positive stop means for limiting the resilient movement of said support, though it will be understood the support may have such inherent characteristics that its resilient movement is self-limited to a degree causing proper actuation. In the preferred embodiment of the invention, though this is not limitative on the broader aspects thereof, the support is in the form of a vertically arranged spring wire having a seat member at its upper end. Spaced from this wire and preferably extending entirely about it, is a ring which is adapted to limit the extent of resilient movement of the wire. When the element to which the support is applied is vibrated below the critical degree, the limiting means is not operatively contacted by the wire, the wire moving resiliently as the rigid body member vibrates under the influence of the disturbance and the weight remaining seated. However, as soon as the amplitude of vibration of the wire is raised to the critical stage so it operatively engages the limiting means, said wire is checked in its resilient movement and the weight, by reason of its inertia, is dislodged from the seat, and in its dislodgment or displacement is adapted to act either directly or indirectly to control some associated device.

The character of the seat, the degree of resilience of a given length of wire, the size of the ball in its relation to the seat, and the spacing of the stop means from the wire or the inherent limit of vibratory movement of the wire, all enter into the calculation whereby a given device is fashioned to respond operatively upon the occurrence of a disturbance of predetermined character, and exhaustive experiments have shown that these calculations may be made so accurately that a given device will absolutely be kept from operation until the amplitude of the vibrations arising from a disturbance is of a predetermined character and then will respond operatively and instantly.

I have also provided means whereby the weight may be dislodged either by reason of wilful manipulation by those in authority in the event it is desired to operate it during an emergency when the usual service control devices cannot be reached; and also means whereby the weight is dislodged upon a dangerous rise in temperature such as might occur in the event of fire in an equipped building. This thermal controlled means has been embodied with the weight support in a very novel manner, a manner which does not increase the number of working parts and yet is highly efficient in operation. This feature, however, may be discussed in detail to better advantage in the following specification, wherein further objects and novel features of the invention will be made apparent.

Reference will be had to the accompanying drawings, in which:

Fig. 1 is a sectional view through a valve to which an embodiment of my invention is applied;

Fig. 2 is a top plan of Fig. 1 but showing the cover and weight removed;

Fig. 3 is an enlarged fragmentary section on line 3—3 of Fig. 2;

Fig. 4 is a view similar to Fig. 3 but showing the change in position of parts brought about by a change in thermal conditions;

Fig. 5 is a view similar to Fig. 3 but showing a variational form of support;

Fig. 6 is a view similar to Fig. 3 but showing a variational form of stop means;

Fig. 6ª is an enlarged fragmentary section on line 6ª—6ª of Fig. 6;

Fig. 7 shows a variational embodiment of the invention;

Fig. 8 shows another variational embodiment of the invention, wherein the support is applied to a switch operating device;

Fig. 9 is a section on line 9—9 of Fig. 8;

Fig. 10 is a section on line 10—10 of Fig. 8; and

Fig. 11 is a fragmentary view similar in part, to Fig. 9, but showing the switch in different position.

In Fig. 1 I have indicated a valve housing 10 made up of bottom section 11 and dome-like top section or cover 12 bolted together at 13.

Bottom section 11 has a conical bore 14 which opens at its lower, smaller end to a port 15 having a horizontal branch 16 with which outlet pipe 17 communicates, a valve seat being formed at 18. An inlet port 19 is in communication with inlet pipe 20 and has a vertical branch 21 opening through the side wall 22 of conical section 11 to bore 14. Assuming that valve 10 be inserted in a gas line, the gas normally has free passage from pipe 20 through ports 19, 21, bore 14, ports 15, 16 and pipe 17.

A spherical weight 23 is supported within the valve and is of such size that when it is dislodged from its seat and drops vertically into the dotted line position of Fig. 1 it engages seat 18 and thereby prevents the flow of gas from bore 14 to pipe 17.

I will now describe the illustrated mounting for ball 23 which, as stated above, is adapted to become an actual closure or stopper element for the valve, proper, though it will be pointed out that it is not essential to the invention that the weigh be employed in this particular manner upon its dislodgment.

A downwardly inclined base plate 24, preferably segmental, as viewed in plan, is detachably secured at 25 to flange 26 which extends radially inward from wall 22. A resilient support, in the form of a spring wire 27, extends vertically from base plate 24, attachment to said plate being made in any suitable manner. For instance, the wire may pass through a coaxial bore 28 in the plate and then be turned under and soldered to a clip 29 which is bolted at 30 to the underside of the plate. Of course, this particular method of attachment or securement of the resiliently supported member is in no way limitative on the invention, considered broadly.

Support 27 carries at its upper end a substantially coaxial seat member 31, which preferably, though not necessarily, is in the form of a vertically arranged tube whose upper end has conical characteristics as at 32 giving a relatively sharp, annular seating edge 33 which is internally defined by the upwardly opening bore 34 of tube 31. Attachment between tube or seat member 31 and support 27 may be conveniently made by a body of solder, or the like, 35, the upper end of the support preferably being crimped at 36 and the tube walls having apertures 37 for the solder to run into so the wire and tube may be, in effect, cast together by the body of solder in such a manner that relative expansion or contraction, due to temperature changes within predetermined limits, will not cause relative separative displacement. As a particular feature, I prefer to utilize material of a fusible nature for body 35, this material being adapted to fuse at a predetermined critical temperature chosen to meet a given situation, but the action of the parts when said critical temperature stage has been reached will be discussed at a later point.

I have specified a particular formation of seat 33, and while my invention, broadly considered, is not limited to this particular seat, it has certain features which render it particularly advantageous. In the first place, it gives a seating surface of a nature which permits of accurate calculation to determine its ball-supporting characteristics under given conditions. Furthermore, it is of a "self-cleaning" nature in that it does not permit the accumulation of extraneous matter between the ball and seat, the bore of the tube opening to the top thereof and extending beneath the ball a sufficient distance to insure clearance beneath said ball. It will be readily appreciated that were the seat of a character to permit the accumulation of extraneous matter between it and the ball, the ball either would not seat with sufficient accuracy to respond properly under given conditions or that such matter might tend to hold the ball by adhesion undesirably against displacement. The character of the seat is also such that there is practically no danger of the ball and seat rusting together or of corrosion of the seat in a manner tending to allow inaccurate seating of the ball.

With the ball thus supported, it will be seen that when valve 10 is vibrated under the influence of minor earth disturbances or the like, the spring wire has resilient movement and the ball is not dislodged from its seat. However, since it is desirable, when the vibrations reach a predetermined critical degree, that the ball immediately be dislodged, I have provided means for limiting the resilient movement of wire 27, though the wire itself may have such inherent characteristics that its resilient movement is checked without the aid of an outside agency when such critical stage is reached and therefore cause ball dislodgment. A standard 38 extends upwardly from plate 24 and supports a stop member 39 which may be generally described as a ring substantially coaxial with and annularly spaced from wire 27. Since the extent of spacing or the effective diameter of ring 39 determines the amplitude allowed the wire before it has movement limiting or stopping effect, and since it is sometimes desirable to alter the device so as to vary its response to suit different vibratory conditions, it is desirable, though not necessary, that the ring be adjustable. For this purpose I provide a bushing or supplemental ring 40 adapted to fit within the aperture of ring 39 (the latter being held to post 38 through radial arm 41 and screw 42) a horizontal flange 43 on the bushing resting on top ring 39 to hold said bushing against dropping. With tube 31 of a given diameter, a bushing 40 is chosen having such internal diameter that predetermined annular clearance is provided between the tube and bushing to allow a predetermined extent of resilient movement to wire 27, it being noted that the bushing or ring limits the resilient movement of wire 27 in every direction. It follows, that when the vibrations reach such a stage that wire 27 swings tube 36 against bushing 40, the bushing thus checking the movement of the wire or support, ball 23, by virtue of its inertia, continues in its movement and topples off seat 33. It then drops down through bore 14 into the valve closing position indicated by dotted lines in Fig. 1. If it happens that the ball, in its displacement, falls onto base 24, the inclination of the latter is such that the ball rolls therefrom into bore 14. Consequently, base 24 and the conical wall of bore 14 may be considered as means for guiding the ball through its fall to "seat" or closing position.

In the assembly of the various elements of the device, wire 27 is of such length that its upper end 44 extends above the horizontal plane of the top of bushing 40 or, when said bushing is not used, above the top of ring 39. Consequently, in the event the temperature about the valve rises to such a degree that material 35 is fused, tube 31 slides down over the wire to the position of Fig. 4, said tube being aided in its downward movement by the weight of ball 23. As the seat moves downwardly the ball contacts with the upper end 44 of the wire, and since it cannot balance thereon, it immediately topples off and falls to valve-closing position. With the ring 39 fashioned as shown, were the top of wire 27 not to extend thereabove, when tube 31 descended upon the fusing of material 35, the ball might merely be lowered to seat on said ring so valve-closure would not be effected. The end of the wire may thus be considered as means for limiting the downward movement of the ball when the tube descends and for toppling the ball clear of ring 39 or similar structure. A noteworthy feature of this thermal control arrangement is that it calls for no extra parts, it being necessary to provide some means for securing tube 31 and wire 27 together and the fusible material performs this function as well as any expedient besides having the characteristics of putting the device into operation in the event of temperature changes.

In the embodiment here disclosed, it will be noted that wire 27 and ball 23 are coaxial with valve seat 18, but this is not to be considered as limitative on the invention, for it will be readily appreciated that the support and ball may be offset from said seat since the walls of bore 14 are adapted to guide the ball to seat irrespective of its original position with relation thereto.

In some situations, it is desirable that the ball 23 be displaced in a manner to close the valve in the absence of disturbances. For instance, in case of fire when the valve is not exposed directly to the heat and yet the usual service cut-outs cannot be reached, it may be desired by authorized parties to secure immediate valve closure by manually dislodging the ball. For this purpose I have provided vertically arranged plunger 45 which is mounted for reciprocation through stuffing box 45$^a$ in the top of cap 12 and has a head 46 exposed above said cap. Plunger 45 is vertically offset from the vertical axis of ball 23 but is so disposed that when it is moved downwardly from the position of Fig. 1, its lower end is adapted to strike the ball off-center and displace it laterally, thereby toppling it from its seat and allowing it to drop to valve-closing position.

In Fig. 5 I have shown a variational form of weight-support, all parts of the drawings which are similar to those previously described, being given the same reference numerals. In this case, however, the support 27$^a$ is in the form of a coiled spring, though its upper end is provided with a vertical shank portion 27$^b$ of sufficient length to allow sleeve 31 to drop clear of the ball upon the fusing of material 35, the end 44 of said shank extending above the top of bushing 40 for the reason described in connection with the other figures. It will be noted that this support is both horizontally and vertically resilient.

In Figs. 6 and 6$^a$ I have shown a variational form of means for limiting the resilient movement of support 27$^c$. In this variation base member 24$^a$ has a vertical bore 28 into which is tightly fitted a plug 28$^a$ which, in turn, carries wire 27$^c$. The means for limiting the resilient movement of this supporting wire is in the form of a vertically arranged tube 39$^a$ which is preferably substantially coaxial with said wire. The bore of tube 39$^a$ or of bushing 40$^a$, supported thereby, determines the amplitude allowed support member 27$^c$ to the ends set forth in connection with the other figures. Tube 39$^a$ may be cut away at one side 39$^b$ in order that tools may be applied to wire 27$^c$ to adjust it or line it up within the bore. As in the other case it will be remembered that the use of bushing 40$^a$ is not essential, as the upper end of the tube may as well be used to limit the resilient movement of support 27$^c$, though interchangeable bushings with bores of different diameters may be used to advantage where it is desired to adjust the device to establish variable limits for the resilient movement of the support and thereby vary the sensitivity of the device.

In Fig. 7 I have shown a structure wherein ball 23, instead of being a closure or stopper element in itself, is adapted to act as a releasing member to allow other means to come into play for closing a valve. In this installation, I have shown a housing 46$^a$ having a base plate 24$^b$ similar to plate 24, and the weight supporting member 27$^d$ and limiting means 39$^d$ are the same as members 27 and 39, respectively, described heretofore. In this case, however, valve 10$^a$ is not directly associated with weight 23. The valve is interposed in pipe-line P and has a usual cylindrical, ported plug 47, which, in the position of Fig. 7, is in position to allow free passage through the valve. Plug 47 carries a radial arm 48 on which is mounted weight 49, the arm and weight normally being held up by a latch crank 50 pivotally supported at 51 to housing 45 and having a hook 52 engaging the arm-carried hook 53. The normal tendency of weight 49 is to swing the valve to closed position, but it is restrained from such movement by member 50.

The inner end of member 50 is in the form of an extension or trigger 54 which is disposed in the path of fall of weight 23. Consequently, when weight 23 is dislodged from its seat under any of the conditions enumerated above, it strikes trigger 54, swinging arm 50 in a counterclockwise direction and thus freeing hook 52 from hook 53 and allowing weight 49 to swing arm 48 and thereby turn plug 47 to valve-closing position.

In Figs. 8 to 11, inclusive, I have shown a situation wherein displacement of the weight is adapted to operate a switch. In this particular arrangement, the ball acts merely to release the switch for automatic actuation from closed to open position. However, this is merely illustrative of a use of the ball in controlling electrical circuits, and it will be understood it may as readily be applied to a switch which is adapted to be closed by the ball or in which the ball itself is one of the circuit members when it is in dislodged position. Or, again, the ball may be a circuit closing member when in its normal position and serve to open said circuit when it is dislodged.

The switch here disclosed is fully described in my co-pending application entitled "Device for operating electric switches", filed April 5, 1927, Serial No. 181,245, and I will therefore not enter into a detailed description of it here. The matter may be disposed of by stating that the switch generally indicated at S is rendered automatically openable by virtue of springs 60, but it is normally and releasably held against automatic opening by virtue of a frangible trigger 62 arranged in the path of fall of ball 23. The weight support 27$^e$ and means 39$^e$ limiting the resilient movement thereof may be similar to support 27 and means 39, respectively, as previously described, the arrangement being such that the ball is displaced in the same manner, either under vibrations or predetermined thermal conditions as previously described.

The ball, in its fall, is guided through tube 64 and impacts against trigger 62 with sufficient force to break it, the springs 60 then being freed for actuation, throwing the switch to the open position of Fig. 11.

In the event it is desired to displace the ball manually, a rock shaft 65, journaled in the walls of housing 59, is rotated either manually or by the application of projected means against the exposed blade 67. A striker 68 on the rock shaft is so disposed that this rotation of the shaft impinges the striker against the ball and knocks it from seat, whereupon it is free to fall and release the switch operating springs from restraint.

It will be understood the drawings and description are to be considered merely as illustrative of and not restrictive on the broader claims appended hereto, for various changes in design, structure and arrangement may be made without departing from the spirit and scope of said claims.

I claim:

1. In combination with apparatus adapted to be operated by displacement of a weight, a resilient support, a weight supported thereon for displacement by disturbances of predetermined character, and adjustable means for variably limiting the resilient movement of the support.

2. A pipe shut-off embodying a valve, a resilient support associated with the valve, a weight seated on the support for displacement therefrom by disturbances of predetermined character, means for limiting the resilient movement of the support, and means to close the valve by the weight after it is displaced.

3. A pipe shut-off embodying a valve, a resilient support associated with the valve, a weight seated on the support for displacement therefrom by disturbances of predetermined character, and means for limiting the resilient movement of the support, said weight being free to fall after it is unseated, said weight, in its fall, closing the valve.

4. A support for a ball displaceable by disturbances of predetermined character, embodying a vertically arranged, horizontally resilient supporting member, and an annular seat substantially concentric with the supporting member for the ball and carried by the supporting member from which seat the ball is displaceable under the influence of earth disturbances.

5. In a vibratory control, a vertically arranged horizontally resilient wire, and a weight-seat on said wire and movable horizontally with the wire.

6. In a vibratory control, a vertically arranged, horizontally resilient wire, a tube secured to the wire near its upper end and presenting an upwardly facing annular edge, said tube being movable with the wire during horizontal resilient movement thereof, and a weight displaceably seated on said annular edge.

7. In a vibratory control, a vertically arranged resilient wire, a tubular weight-seat about said wire, and fusible means holding the seat to the wire.

8. In a vibratory control, a horizontally resilient wire, anchored near one end only, and a weight-seat on said wire at a point spaced from said anchored end and from which a weight seated thereon is displaceable under the influence of earth disturbances.

9. In a vibratory control, a horizontally resilient supporting member anchored at a given point, and means for limiting the resilient movement of the member, said means being characterized as a ring about and annularly spaced from the member at a point spaced longitudinally along the supporting member from said given point.

10. In combination with apparatus adapted to be operated by displacement of a weight, a resilient support, a weight-seat, fusible means holding the seat to the support, and a weight supported on the seat for displacement by disturbances of predetermined character.

11. A pipe shut-off embodying a valve, a resilient support associated with the valve, a weight-seat, fusible means holding the seat to the support, and a weight supported on the seat for displacement therefrom by disturbances of predetermined character, and means to close the valve by the weight after it is displaced.

12. In combination with apparatus adapted to be operated by displacement of a weight, a horizontally resilient support adapted to have horizontal resilient movement under the influence of earth disturbances, and a weight supported on the support for displacement by such disturbances when they are of predetermined character.

13. In combination with apparatus adapted to be operated by displacement of a weight, a horizontally resilient support adapted to have horizontal resilient movement under the influence of earth disturbances, and a weight supported on the support for displacement by such disturbances when they are of predetermined character, said weight being free to fall when it is unseated.

14. In combination with apparatus adapted to be operated by displacement of a weight, a horizontally resilient support adapted to have horizontal resilient movement under the influence of earth disturbances, a weight supported on the support for displacement by such disturbances when they are of predetermined character, and means for limiting the horizontal resilient movement of the support.

15. In combination with apparatus adapted to be operated by displacement of a weight, a horizontally resilient support adapted to have horizontal resilient movement under the influence of earth disturbances, a weight supported on the support for displacement by such disturbances when they are of predetermined character, and adjustable means for variably limiting the horizontal resilient movement of the support.

16. A pipe shut-off embodying a valve, a horizontally resilient support associated with the valve and adapted to have horizontal resilient movement under the influence of earth disturbances, a weight seated on the support for displacement by such disturbances when they are of predetermined character, and means to close the valve by the weight after it is unseated.

17. A pipe shut-off embodying a valve, a horizontally resilient support associated with the valve and adapted to have horizontal resilient movement under the influence of earth disturbances, and a weight seated on the support for displacement by such disturbances when they are of predetermined character, said weight being free to fall after it is unseated, said weight in its fall, closing the valve.

In witness that I claim the foregoing I have hereunto subscribed my name this 22nd day of March, 1927.

ARTHUR H. BRANDON.

CERTIFICATE OF CORRECTION.

Patent No. 1,742,685.                      Granted January 7, 1930, to

ARTHUR H. BRANDON.

It is hereby certified that error appears in the printed specification of the above numbered patent requiring correction as follows: Page 5, line 84, claim 9, after the word "control" strike out the article "a" and insert the words "an elongated"; and that the said Letters Patent should be read with this correction therein that the same may conform to the record of the case in the Patent Office.

Signed and sealed this 18th day of March, A. D. 1930.

M. J. Moore,
Acting Commissioner of Patents.

(Seal)